P. J. GARRISON.
CAR WHEEL.
APPLICATION FILED OCT. 2, 1907.
908,659.
Patented Jan. 5, 1909.
2 SHEETS—SHEET 1.
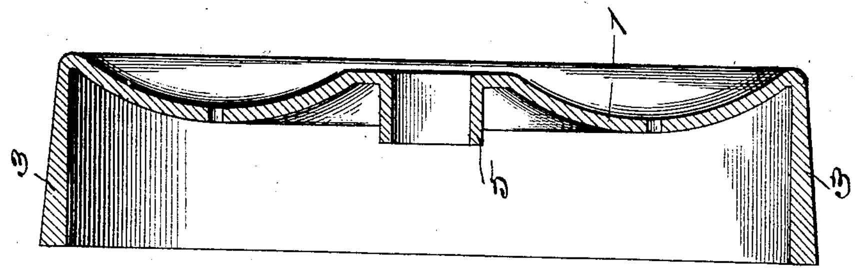
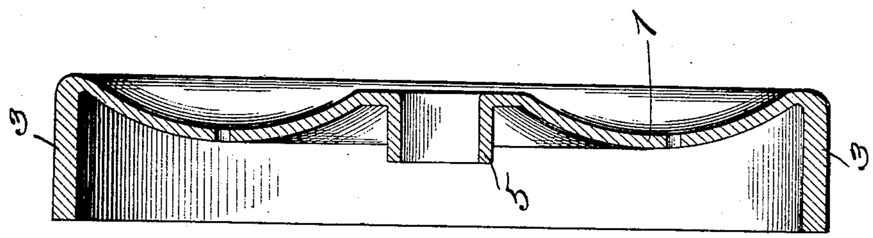
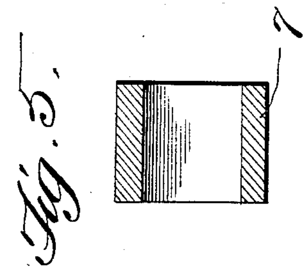
Witnesses
F. G. Boswell.
R. G. Whitcomb
Inventor
P. J. Garrison.
By Swift & Co.
Attorneys
THE NORRIS PETERS CO., WASHINGTON, D. C.

P. J. GARRISON.
CAR WHEEL.
APPLICATION FILED OCT. 2, 1907.
908,659.
Patented Jan. 5, 1909.
2 SHEETS—SHEET 2.
Fig. 3.
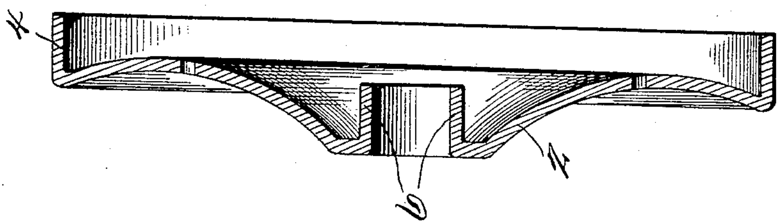
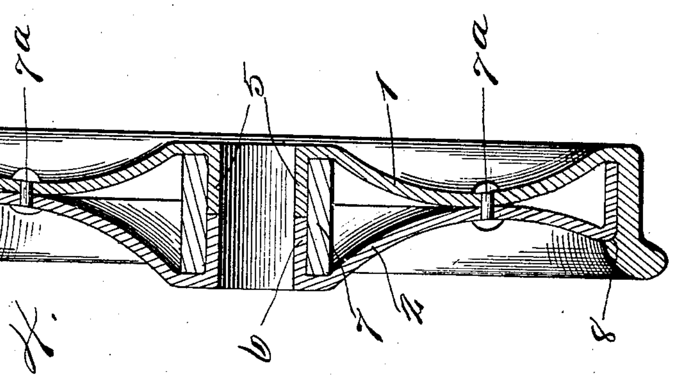
Fig. 4.
Witnesses
F. G. Boswell
K. G. Whitcomb
Inventor
P. J. Garrison
By Swift & Co.
Attorneys
THE NORRIS PETERS CO., WASHINGTON, D. C.

UNITED STATES PATENT OFFICE.

PERRY J. GARRISON, OF THREE RIVERS, MICHIGAN.

CAR-WHEEL.

No. 908,659. Specification of Letters Patent. Patented Jan. 5, 1909.

Application filed October 2, 1907. Serial No. 395,601.

*To all whom it may concern:*

Be it known that I, PERRY J. GARRISON, a citizen of the United States, residing at Three Rivers, in the county of St. Joseph and State of Michigan, have invented a new and useful Car-Wheel; and I do hereby declare the following to be a full, clear, and exact description of the invention, such as will enable others skilled in the art to which it appertains to make and use the same.

This invention relates to certain new and useful improvements in car or other similar wheels, and one of the objects in view is to provide a wheel of this character consisting of two disks having flanges thereon, and a reinforcement sleeve, one of said flanges of one of the disks being designed to form the essential tread of the wheel which tread is reinforced by the flange of the other disk. Lightness, strength and durability is to be embodied in constructing a wheel of this character; it being understood that the preferred metal for producing the wheel, which is pressed steel, must possess the above characteristics.

The most essential object of the invention is to provide a wheel consisting of two disks and a sleeve, each disk having a circumferential flange, one of which is reinforced by the other and adapted to form the tread of the wheel, a portion of which is struck up or upset, as shown in Figure 4 of the drawings, so as to form the circumferential retaining flange for the tread of the wheel and a circumferential shoulder, as shown, to prevent displacement of the other disk.

This invention comprises further objects and combinations of elements which will be hereinafter more fully described, shown in the accompanying drawings, and the novel features thereof will be pointed out by the appended claim.

To obtain a full and correct understanding of the details of construction, combinations of features, elements and advantages, reference is to be had to the hereinafter set forth description and the accompanying drawings in connection therewith, wherein—

Fig. 1 is a sectional view longitudinally through one of the disks forming one side of the wheel. Fig. 2 is a longitudinal section through the same disk showing the second step in forming the said disk ready to receive the opposite disk shown in Fig. 3. Fig. 3 is a longitudinal section through the inner disk. Fig. 4 is a longitudinal section illustrating the complete wheel showing the retaining flange struck up and also the shoulder to prevent displacement of the inner disk. Fig. 5 is a detached longitudinal section of the hub-section encompassing sleeve.

Making renewed reference to the accompanying drawings, wherein similar reference characters indicate corresponding parts in the several illustrations, Fig. 4 illustrates a representation of the finished wheel which consists of two disks 1 and 2, each of which is provided with a circumferential flange 3 and 4, the flange 4 being adapted to form a reinforcement for the flange 3, as shown clearly in Fig. 4. Projecting from one face of the disk 1 is a hub portion 5 against the edge of which a similar hub portion 6 carried integrally with the disk 2 is adapted to abut, that is after the sleeve 7 has been inserted over the hub portion 5 which sleeve forms a reinforcement for the two hub portions, as clearly illustrated in the drawings.

When the two flanges have been assembled, as shown in Fig. 4, by placing the disks adjacent one another rivets $7^a$ are employed to fasten the disks together, as clearly illustrated. After the disks are assembled, as shown in Fig. 4, the retaining flange is struck up or upset which also forms a shoulder 8 for the purpose of preventing displacement of the disk 2, as clearly shown in the drawings.

From the foregoing, the essential features, elements and the construction of the device, as well as the formation, together with the simplicity thereof will be clearly observed, and, when manufactured in accordance with the invention, the same may be marketed at a low price.

Having thus fully described the invention, what is claimed as new and useful, by the protection of Letters Patent, is:—

A car wheel comprising two members having their inner hub sections opposed at their free ends to each other, a sleeve member encompassing said hub sections, each member having a circumferential flange, one being of greater width and thickness than the other and adapted to over lap when the members are assembled so as to form a tread for the wheel, means for securely fastening the members together, the flange of greater width and thickness having its accessible width and thickness forced by high pressure into a solid annular wheel retaining flange, as and for the purpose specified.

In testimony whereof I have signed my name to this specification in the presence of two subscribing witnesses.

PERRY J. GARRISON.

Witnesses:

N. W. GARRISON,

P. P. MAJOR.